(12) United States Patent
Murakami

(10) Patent No.: US 9,720,270 B2
(45) Date of Patent: Aug. 1, 2017

(54) DISPLAY APPARATUS

(71) Applicant: Sakai Display Products Corporation, Sakai-shi, Osaka (JP)

(72) Inventor: Yoshihiro Murakami, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/647,802

(22) PCT Filed: Jul. 8, 2014

(86) PCT No.: PCT/JP2014/068205
§ 371 (c)(1),
(2) Date: May 27, 2015

(87) PCT Pub. No.: WO2015/008664
PCT Pub. Date: Jan. 22, 2015

(65) Prior Publication Data
US 2015/0309355 A1    Oct. 29, 2015

(30) Foreign Application Priority Data

Jul. 19, 2013 (JP) ................................ 2013-150773

(51) Int. Cl.
*G02F 1/1333* (2006.01)
*F21V 8/00* (2006.01)
*G02F 1/1335* (2006.01)

(52) U.S. Cl.
CPC ..... *G02F 1/133308* (2013.01); *G02B 6/0031* (2013.01); *G02B 6/0073* (2013.01); *G02B 6/0088* (2013.01); *G02B 6/0091* (2013.01); *G02F 1/1336* (2013.01); *G02F 1/133603* (2013.01); *G02F 2001/133317* (2013.01)

(58) Field of Classification Search
CPC ... G02F 1/133308; G02F 2001/133314; G02F 2001/13332
See application file for complete search history.

(56) References Cited

U.S. PATENT DOCUMENTS

| 2004/0141102 A1* | 7/2004 | Lin ................... G02F 1/133308 349/58 |
| 2010/0165235 A1 | 7/2010 | Lee et al. |
| 2012/0063167 A1* | 3/2012 | Ozawa ................ G02B 6/0031 362/609 |

FOREIGN PATENT DOCUMENTS

| CN | 101067693 A | 11/2007 |
| CN | 101770095 A | 7/2010 |

(Continued)

*Primary Examiner* — Phu Vu
(74) *Attorney, Agent, or Firm* — Rudy J. Ng; Bret E. Field; Bozicevic, Field & Francis LLP

(57) ABSTRACT

The display apparatus includes a display panel having a display surface on one surface thereof, a back surface member disposed on the other surface side of the display panel, a light source disposed between the display panel and the back surface member, an outer frame body which covers a peripheral edge part of the display panel and surrounds the back surface member, and an inner frame body which holds the display panel and is provided in the outer frame body, wherein the inner frame body is made of a white color system synthetic resin containing light shielding characteristics. For example, the inner frame body contains a small amount of carbon black in a white color system polycarbonate resin.

10 Claims, 9 Drawing Sheets

(56) References Cited

FOREIGN PATENT DOCUMENTS

| | | |
|---|---|---|
| JP | 2002-040394 A | 2/2002 |
| JP | 2002-260426 A | 9/2002 |
| JP | 2006-171378 A | 6/2006 |

* cited by examiner

FIG. 5

| CONTENT OF CARBON BLACK (%) | 0 | 0.003 | 0.01 | 0.02 | 0.03 |
|---|---|---|---|---|---|
| MATERIAL COLOR | WHITE | LIGHT GLAY | GLAY | GLAY | DARK GLAY |
| TRANSMITTANCE (%) | 10 | 0.1 OR LESS | 0.1 OR LESS | 0.1 OR LESS | 0.1 OR LESS |
| REFLECTANCE (%) | 95 | 65 | 50 | 45 | 30 |
| PRESENCE OR ABSENCE OF BRIGHT LINE | PRESENT | ABSENT | ABSENT | ABSENT | ABSENT |
| PRESENCE OR ABSENCE OF LIGHT LEAKAGE | PRESENT | ABSENT | ABSENT | ABSENT | ABSENT |
| QUALITY | GOOD | GOOD | GOOD | GOOD | BAD |
| OVERALL JUDGMENT | BAD | GOOD | EXCELLENT | GOOD | BAD |

DISPLAY APPARATUS

CROSS-REFERENCE TO RELATED APPLICATIONS

This application is the national phase under 35 U.S.C. §371 of PCT International Application No. PCT/JP2014/068205 which has an International filing date of Jul. 8, 2014 and designated the United States of America.

BACKGROUND

The present invention relates to a display apparatus including a display panel and a backlight.

DESCRIPTION OF THE RELATED ART

A liquid crystal display apparatus includes a liquid crystal display panel having a display surface on a front surface thereof, a backlight and the like. As the backlight, for example, there is a direct light type in which a diffusion plate for diffusing light from light emitting diodes (LEDs) is provided on a rear surface side of the liquid crystal display panel, or an edge light type which includes a light guide plate disposed on the rear surface side of the liquid crystal panel, and the LEDs disposed to face an end face of the light guide plate. Light emitted from the LEDs is made incident inside of the light guide plate from the end face of the light guide plate, and is made incident inside of the liquid crystal display panel from the rear surface side of the liquid crystal display panel through the light guide plate.

In the above-described liquid crystal display apparatus, a frame portion of a bezel is significantly narrowed due to narrowing of the frame. In this case, light from a light source of the backlight leaks, such that a band-shaped bright line is generated on a peripheral edge part of the display surface, and thereby causing a deterioration in display quality.

Therefore, a liquid crystal display apparatus, in which a visor for covering the backlight light source is provided on the light guide plate, and a part of the visor of the light guide plate facing a periphery of the liquid crystal display panel with no connection part to a driver IC mounted thereon is processed into an opaque white color, thereby preventing an occurrence of the bright line, has been disclosed (for example, Japanese Patent Application Laid-Open No. 2006-171378).

SUMMARY

However, in the liquid crystal display apparatus of Japanese Patent Application Laid-Open No. 2006-171378, since the visor for covering the light source is formed on the light guide plate, forming the visor for covering the light source is not always possible depending on a positional relationship between the light guide plate and the light source.

Therefore, it may not be able to prevent an occurrence of bright lines depending on the positional relationship between the light guide plate and the light source. Further, in recent years, narrowing of the frame has been required, and the bezel covering the peripheral edge part of the liquid crystal display panel and a chassis disposed on the inside of the bezel are attached by fitting to each other, such that light of the light source leaks from a gap formed in the fitted portion.

In consideration of the above-mentioned circumstances, it is an object of the present invention to provide a display apparatus capable of preventing an unnecessary leakage of light.

According to one aspect of the present invention, there is provided a display apparatus which includes a display panel having a display surface on one surface thereof, a back surface member disposed on the other surface side of the display panel, a light source disposed between the display panel and the back surface member, an outer frame body which covers a peripheral edge part of the display panel and surrounds the back surface member, and an inner frame body which holds the display panel and is provided in the outer frame body, wherein the inner frame body may be made of a white color system synthetic resin containing light shielding characteristics.

According to the present invention, the light source is disposed between the display panel and the back surface member. The outer frame body covers the peripheral edge part of the display panel and surrounds the back surface member. The inner frame body is provided in the outer frame body. When light of the light source is going to leak to an outside of the outer frame body, since the inner frame body provided in the outer frame body is made of a white color system synthetic resin containing light shielding characteristics, the light of the light source is shield by the inner frame body, and thereby it is possible to prevent the light from being leaked to the outside of the outer frame body.

In the display apparatus according to the present invention, the outer frame body may have a fitting hole, and the inner frame body may have a protrusion part to be fitted to the fitting hole.

According to the present invention, the outer frame body has the fitting hole, and the inner frame body has the protrusion part to be fitted to the fitting hole. Even when the outer frame body has the fitting hole, since the inner frame body is made of a white color system synthetic resin containing light shielding characteristics, it is possible to prevent such a situation that the light of the light source transmits through the inner frame body and leaks to the outside from the fitting hole. In addition, the fitting hole and the protrusion part are configured to be fitted to each other, thereby it is possible to prevent such a problem that screw fixing from the display panel side to the back surface member side may not be performed due to a narrow width of the outer frame body, and achieve narrowing of the frame.

The display apparatus according to the present invention may include: a light guide plate disposed between the display panel and the back surface member; and a light source disposed to face an end face of the light guide plate, wherein the inner frame body may be provided so as to shield light emitted by the light source from being made incident to the display panel.

According to the present invention, the display apparatus includes the light guide plate disposed between the display panel and the back surface member, and the light source disposed to face the end face of the light guide plate. The inner frame body is provided so as to shield light emitted by the light source from being made incident to the display panel. Thereby, even when seeing the display surface of the display panel from an oblique direction toward the light source, since the inner frame body having light shielding characteristics shields the light directly made incident to the display panel from the light source, it is possible to prevent an occurrence of a bright line appearing when seeing the display surface from the oblique direction.

In the display apparatus according to the present invention, the inner frame body may have a light shielding part disposed along the peripheral edge part of the display panel, between the display panel and the light guide plate.

According to the present invention, the inner frame body has the light shielding part disposed along the peripheral edge part of the display panel, between the display panel and the light guide plate. Since the light shielding part shields the light directly made incident to the display panel from the light source, it is possible to prevent an occurrence of the bright line appearing along the peripheral edge part of the display panel when seeing the display surface from the oblique direction.

In the display apparatus according to the present invention, the inner frame body may contain carbon black in a range of 0.003% to 0.02%.

According to the present invention, the inner frame body contains carbon black in a range of 0.003% to 0.02%. If a content of the carbon black is less than 0-0.03%, the transmittance of light thereof becomes several %, for example, thereby it is not possible to prevent an occurrence of the light leakage or bright line. In addition, if the content of the carbon black exceeds 0.02%, the color of the inner frame body becomes a relatively dark gray, thereby degrading the quality of the display apparatus. By making the content of the carbon black in a range of 0.003% to 0.02%, it is possible to prevent an occurrence of the light leakage or bright line, as well as maintain the quality of the display apparatus.

In the display apparatus according to the present invention, the inner frame body may contain titanium oxide.

According to the present invention, the inner frame body contains titanium oxide. By containing the titanium oxide, it is possible to make the reflectance of the inner frame body to be almost 100%, and make the transmittance of light to be 0.1% or less. Thereby, it is possible to prevent an occurrence of the light leakage or bright line, and maintain the quality of the display apparatus.

In the display apparatus according to the present invention, wherein the inner frame body may have a transmittance of light of 0.1% or less.

According to the present invention, the inner frame body has a transmittance of light of 0.1% or less. By making the transmittance of light thereof to be 0.1% or less, it is possible to prevent an occurrence of the light leakage or bright line, as well as maintain the quality of the display apparatus.

In the display apparatus according to the present invention, the inner frame body may have a reflectance of 45% or more.

According to the present invention, the inner frame body has a reflectance of 45% or more. If the reflectance thereof becomes less than 45%, the color of the inner frame body becomes a relatively dark gray, thereby degrading the quality of the display apparatus. By making the reflectance thereof to be 45% or more, it is possible to maintain the display quality in good condition.

The above and further objects and features will more fully be apparent from the following detailed description with accompanying drawings (US only).

According to the present invention, it is possible to prevent an unnecessary leakage of light.

BRIEF DESCRIPTION OF THE DRAWINGS

FIG. 5 is a diagram describing an example of the characteristics of the display apparatus when changing the content of the carbon black in the chassis of Embodiment 1.

DETAILED DESCRIPTION

Embodiment 1

Figure 1:
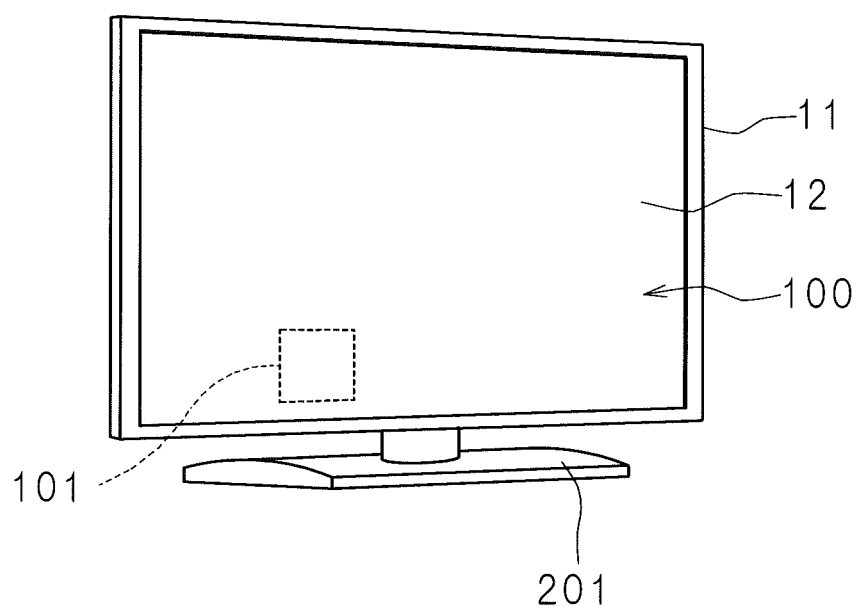
FIG. 1 is an external perspective view illustrating an example of a configuration of a television receiving apparatus of Embodiment 1.

Hereinafter, the present invention will be described in detail with reference to the accompanying drawings illustrating embodiments thereof. FIG. 1 is an external perspective view illustrating an example of a configuration of a television receiving apparatus 200 of Embodiment 1. The television receiving apparatus 200 includes a display apparatus 100, a receiving unit 101 which receives a signal of television broadcasts, a stand 201 and the like. The display apparatus 100 displays an image based on the signal of television broadcasts received by the receiving unit 101. In addition, the display apparatus 100 includes a rectangular liquid crystal display panel that is a display panel 12 whose one surface becomes a display surface, and a bezel 11 as an outer frame body for covering a peripheral edge part of the display panel 12. Hereinafter, the display apparatus 100 will be described in detail. Further, the display apparatus 100 of the present embodiment is not limited to a configuration incorporated in the television receiving apparatus 200, but it may also be used as a single body of the display apparatus including an image processing unit therein.

Figure 2:
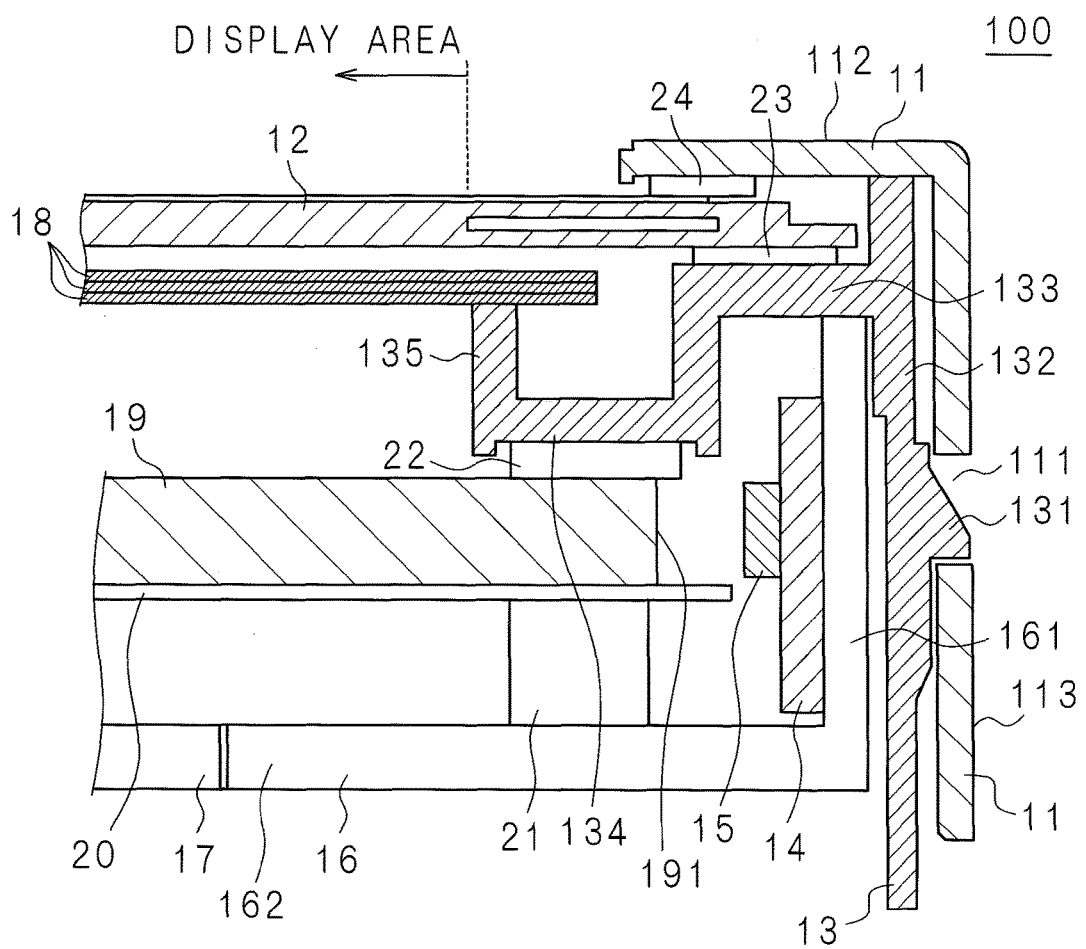
FIG. 2 is a cross-sectional view illustrating main components of a display apparatus of Embodiment 1.

FIG. 2 is a cross-sectional view illustrating main components of the display apparatus 100 of Embodiment 1. As illustrated in FIG. 2, the display apparatus 100 includes the display panel 12 having the display surface on one surface (front surface) thereof, a backlight chassis 17 and a heat dissipation plate 16 which are disposed on the other surface side (rear surface side) of the display panel as a back surface member, a light emitting diode (LED) 15 disposed between the display panel 12 and the backlight chassis 17 and heat dissipation plate 16 as a light source, the bezel 11 which covers the peripheral edge part of the display panel 12 and surrounds the backlight chassis 17 and heat dissipation plate 16, a chassis 13 which holds the display panel 12 and is provided in the bezel 11 as an inner frame body, and a light guide plate 19 which guides light emitted from the LED 15 to the display panel 12. Hereinafter, these components will be described in detail.

The display panel 12 has a pair of glass substrates on the one surface (front surface) and the other surface (rear surface) thereof, and a liquid crystal material sealed between the pair of glass substrates. Herein, by applying a voltage to a driver for driving each pixel of the display panel 12, the transmittance of light which is determined by electro-optical characteristics of the liquid crystal material may be changed, and by controlling an amount of light transmitting through the display panel 12 for each pixel, an image with gradations may be displayed.

In the present invention, the backlight employs a so-called edge light type, and includes the LED 15, a substrate 14 on which the LED 15 is mounted, the light guide plate 19, a reflection sheet 20 disposed on a surface opposite to an emitting surface of light of the light guide plate 19, the heat dissipation plate 16 which is fixed to the substrate 14 to dissipate heat of the LED 15 to an outside, and the backlight chassis 17 which holds these respective members and the like.

The light guide plate 19 is formed in a rectangular shape, and has vertical and horizontal dimensions substantially the same as those of the display panel 12. A material of the light guide plate 19 may be an acrylic resin, a polystyrene resin, or the like, but it is not limited thereto.

The reflection sheet 20 has a similar dimensions as those of the light guide plate 19, and reflects light emitted from the back surface (rear surface) of the light guide plate 19 to again become incident inside the light guide plate 19.

Optical sheets 18 are disposed between the display panel 12 and the light guide plate 19. The optical sheets 18 are formed in a rectangular shape having slightly smaller dimensions than those of the display panel 12. The optical sheets 18 are a sheet in which one or a plurality of sheets each having a light diffusion function and/or a light collection function are laminated.

The substrate 14 is formed in an elongated shape, and a plurality of LEDs 15 are arranged at a proper interval thereon. That is, the plurality of LEDs 15 are linearly disposed in a longitudinal direction of the substrate 14. By this configuration, the LEDs 15 are disposed to face an end face 191 of the light guide plate 19. The substrate 14 has a length substantially equal to the vertical or horizontal dimension of the light guide plate 19, for example.

When the display apparatus 100 has the bezel 11 formed of four top, bottom, left and right sides as illustrated in FIG. 1, there is a type in which the substrate 14 having the LEDs 15 mounted thereon is disposed only on the inside of the bezel 11 of a lower side, or is disposed on the inside of the bezel 11 of two left and right sides.

The heat dissipation plate 16 is made of a material having excellent thermal conductivity, and has a cross section formed in a substantially L shape. The heat dissipation plate 16 has a bottom plate 162 disposed parallel to the light guide plate 19, and a side plate 161 bent in a substantially L shape from the bottom plate 162. The substrate 14 is fixed to the side plate 161. In addition, a light guide plate support 21 is fixed to the bottom plate 162, and the light guide plate support 21 holds the light guide plate 19 and the reflection sheet 20.

The bottom plate 162 of the heat dissipation plate 16 is fixed to the backlight chassis 17.

The bezel 11, which has a function as an outer frame body, covers the peripheral edge part of the display panel 12, and surrounds the backlight chassis 17 and the heat dissipation plate 16, etc. as a back surface member. More specifically, the bezel 11 whose cross section is formed in a substantially L shape has a front face part 112 which covers the peripheral edge part of the display panel 12, and a side part 113 which is bent from the front face part 112 in a substantially L shape and surrounds the backlight chassis 17 and the heat dissipation plate 16, etc. The side part 113 of the bezel 11 has a fitting hole 111 formed therein.

The chassis 13 has a function as an inner frame body, and is provided in the bezel 11. More specifically, the chassis 13 is disposed so as to surround the backlight chassis 17 and the heat dissipation plate 16, etc., and has a side part chassis 132 provided on the outside of the side plate 161 of the heat dissipation plate 16.

The side part chassis 132 is disposed between the side plate 161 and the side part 113 of the bezel 11. The side part chassis 132 has a protrusion part 131 to be fitted to the fitting hole 111. The bezel 11 and the chassis 13 are fixed to each other by fitting the protrusion part 131 to the fitting hole 111.

The chassis 13 has a panel support part 133 which extends from the side part chassis 132 toward the peripheral edge part of the display panel 12 to support the display panel 12, a light guide plate holding part 134 which extends from the panel support part 133 toward the light guide plate 19 to hold the light guide plate 19, a sheet support part 135 which is further bent from the light guide plate holding part 134 in a substantially L shape to support the optical sheets 18 and the like.

The peripheral edge part of the display panel 12 is inserted between the front face part 112 of the bezel 11 and the panel support part 133 to be fixed therebetween through fixing members 23 and 24.

The light guide plate 19 is pressed by the light guide plate holding part 134 through a fixing member 22. Thereby, the light guide plate 19 is fixed at a prescribed position between the light guide plate support 21 and the fixing member 22, whereby an optical axis of the LED 15 and the light guide plate 19 may be positioned with each other.

In addition, as can be seen from FIG. 2, when seeing the display area of the display panel 12 from an oblique direction (for example, a direction inclined 45 degrees with respect to the display surface) toward the LED 15, the light guide plate holding part 134 and the sheet support part 135 are disposed at a position shielding the LED 15. That is, the light guide plate holding part 134 and the sheet support part 135 shield light emitted from the LED 15 from being directly made incident to the display panel 12.

In addition, the chassis 13 is made of a white color system synthetic resin containing light shielding characteristics. More specifically, the chassis 13 contains a small amount of carbon black in a white color system polycarbonate resin. Herein, the white color system basically means a white color, but the same white color may have different shades depending on the differences in material manufacturers. The white color system means a color system including the white color with such a different shade. Further, instead of the polycarbonate resin, a mixture of polycarbonate resin and glass, an ABS resin, a mixture of the ABS resin and the polycarbonate resin, or the like may also be used.

Figure 3:
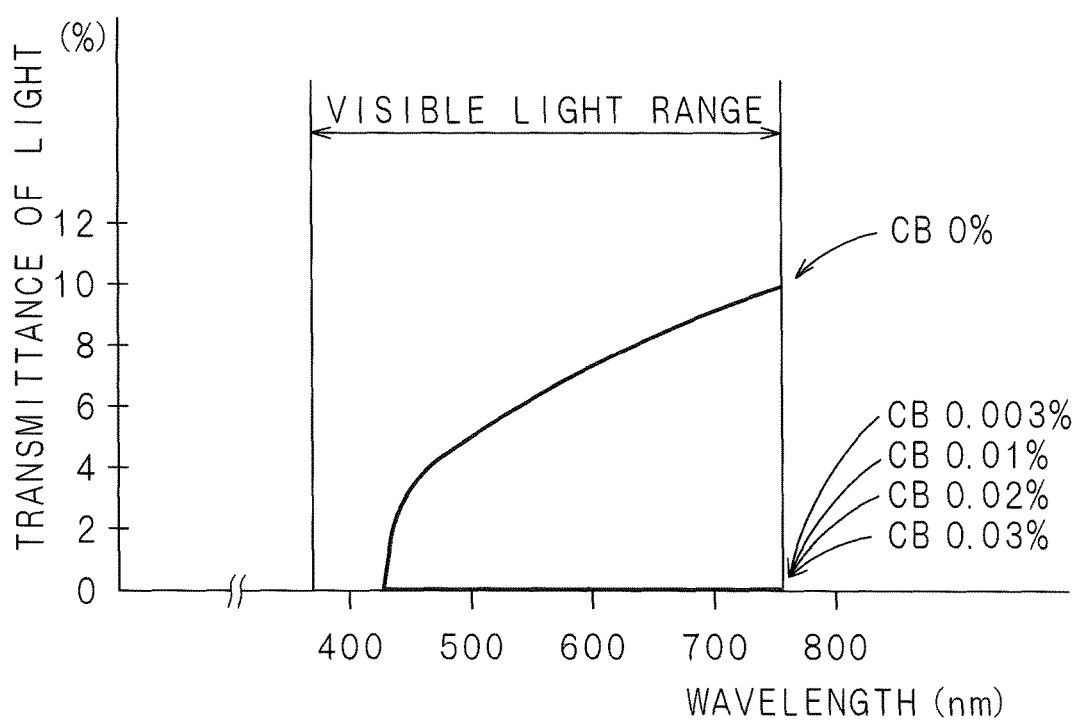
FIG. 3 is a diagram describing an example of transmittance of light when changing a content of the carbon black in a chassis of Embodiment 1.

FIG. 3 is a diagram describing an example of transmittance of light when changing a content of the carbon black in the chassis 13 of Embodiment 1. In FIG. 3, the horizontal axis represents a wavelength, and the vertical axis represents the transmittance of light. In addition, FIG. 3 illustrates the transmittance when changing the content of the carbon black (hereinafter also referred to as a 'CB') to 0%, 0.003%, 0.01%, 0.02% and 0.03%.

As illustrated in FIG. 3, when the content of the carbon black is 0%, the transmittance becomes largest at a wavelength of 750 nm, and becomes 10%. In addition, when the content of the carbon black is 0.003%, 0.01%, 0.02%, and 0.03%, the transmittance becomes 0.1% or less.

Figure 4:
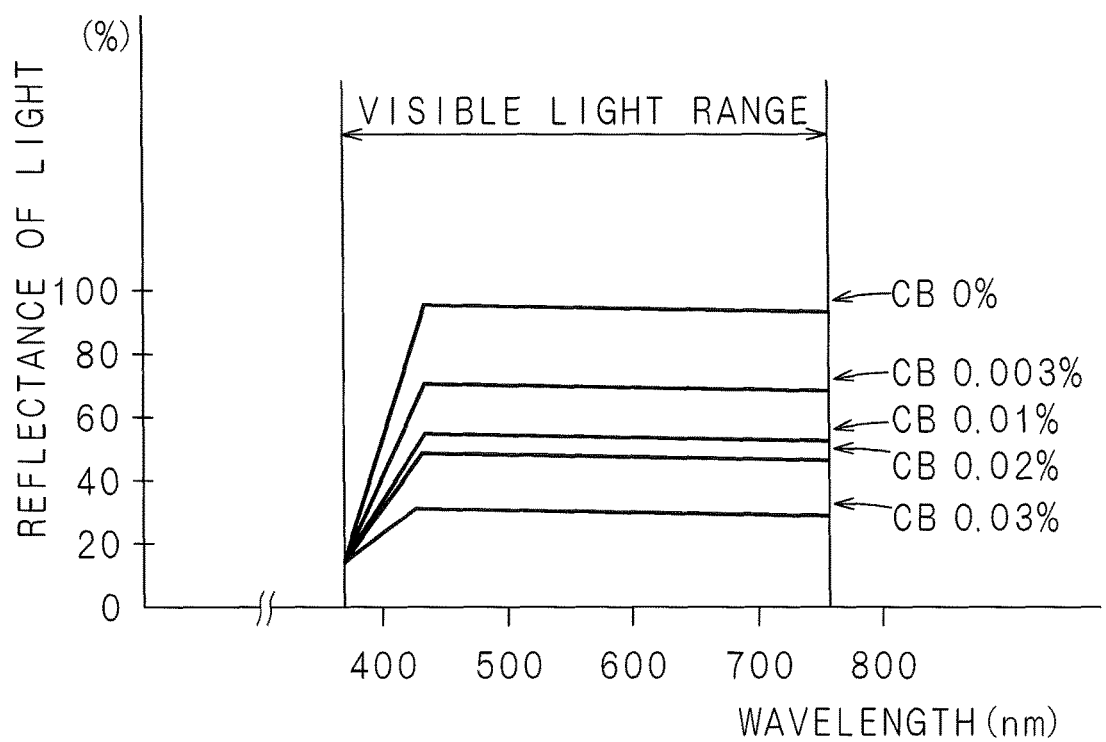
FIG. 4 is a diagram describing an example of reflectance of light when changing the content of the carbon black in the chassis of Embodiment 1.

FIG. 4 is a diagram describing an example of reflectance of light when changing the content of the carbon black in the chassis 13 of Embodiment 1. In FIG. 4, the horizontal axis represents the wavelength, and the vertical axis represents the reflectance of light. In addition, FIG. 4 illustrates the reflectance when changing the content of the carbon black (hereinafter also referred to as a 'CB') to 0%, 0.003%, 0.01%, 0.02% and 0.03%.

As illustrated in FIG. 4, the reflectance increases around a wavelength of 400 nm, and has a tendency of slightly decreasing in response to the wavelength becomes longer wavelength. When the content of the carbon black is 0%, the reflectance becomes 95% at a wavelength of 750 nm. In addition, when the content of the carbon black is 0.003%, the reflectance becomes 65% at a wavelength of 750 nm. When the content of the carbon black is 0.01%, the reflectance becomes 50% at a wavelength of 750 nm. When the content of the carbon black is 0.02%, the reflectance becomes 45% at a wavelength of 750 nm. Further, when the content of the carbon black is 0.03%, the reflectance becomes 30% at a wavelength of 750 nm.

The reflectance and the transmittance illustrated in FIGS. 3 and 4 were measured, for example, using an ultraviolet visible infrared spectrophotometer JASCO V-670DS manufactured by JASCO Co., Ltd., as a measuring instrument under measuring conditions set to a wavelength of 380 to 1200 nm, a scan speed of 1000 nm/min, and using an integrating sphere, wherein a test plate of the same material as the chassis 13 has a thickness of 1 mm.

FIG. 5 is a diagram describing an example of the characteristics of the display apparatus 100 when changing the content of the carbon black in the chassis 13 of Embodiment 1. Similar to FIGS. 3 and 4, FIG. 5 also illustrates an example when changing the content of the carbon black to 0%, 0.003%, 0.01%, 0.02% and 0.03%. FIG. 5 is a table for summarizing the results of FIGS. 3 and 4.

Herein, the material color is a color of the chassis 13. When changing the content of the carbon black to 0%, 0.003%, 0.01%, 0.02% and 0.03%, the reflectance becomes 95%, 65%, 50%, 45% and 30%, and the material color becomes white, light gray, gray, gray, and dark gray, respectively. For example, as can be seen from FIG. 2, when seeing the peripheral edge part of the display panel 12 from the oblique direction, the light guide plate holding part 134 and the sheet support part 135 on the back side of the display panel 12 are now directly visible, and when the color of the chassis 13 is black, the peripheral edge part of the display panel 12 appears dark, and thereby overall quality is deteriorated. As illustrated in FIG. 5, when the material color is within a range from white to gray, the quality is excellent (GOOD), while when the material is dark gray, the quality becomes poor (BAD).

In addition, as illustrated in FIG. 5, when the content of the carbon black was 0%, the transmittance became 10%, and when the content of the carbon black was 0.003%, 0.01%, 0.02% and 0.03%, all the transmittances became 0.1% or less.

In the case of the presence or absence of a bright line, when the content of the carbon black was 0%, a bright line is present, and when the content of the carbon black was 0.003%, 0.01%, 0.02% and 0.03%, a bright line is absent. Similarly, in the case of the presence or absence of light leakage, when the content of the carbon black was 0%, light leakage is present, and when the content of the carbon black was 0.003%, 0.01%, 0.02% and 0.03%, light leakage is absent.

Figure 6:
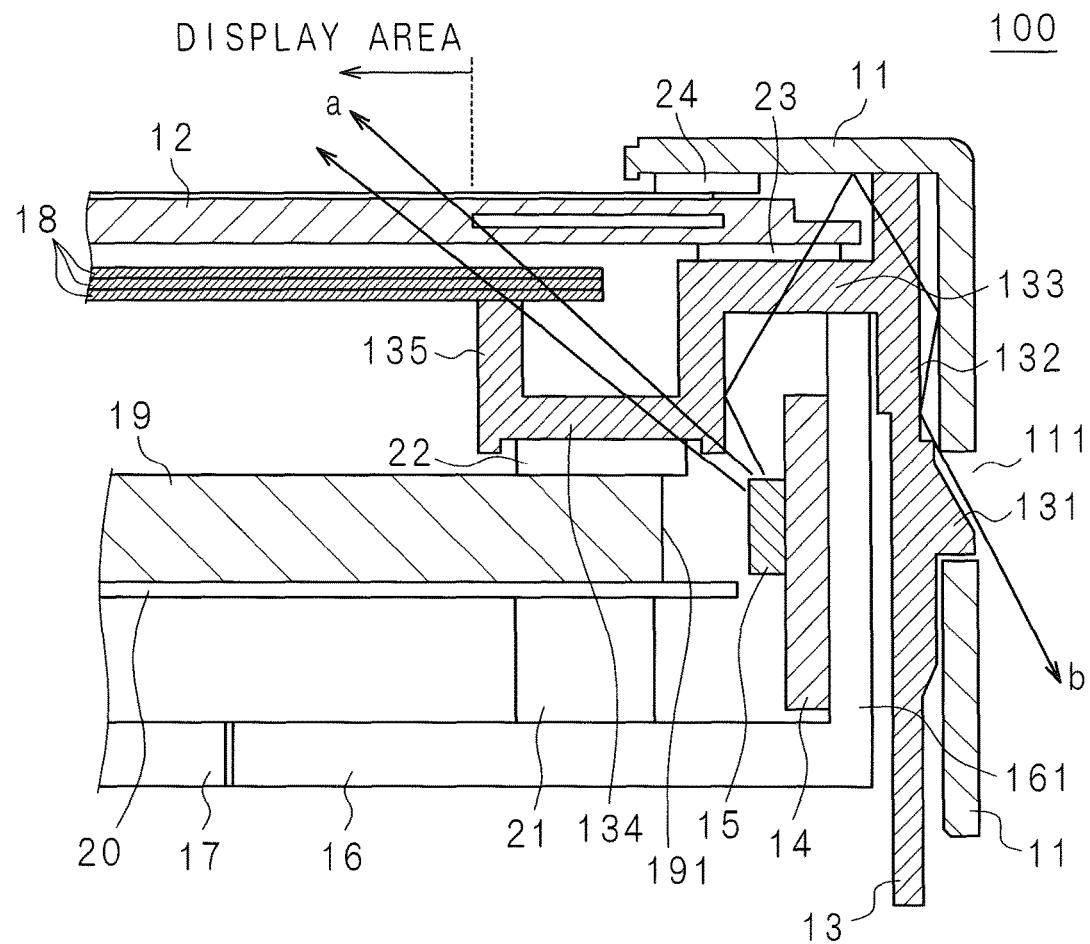
FIG. 6 is a view describing an example of a mechanism for an occurrence of a bright line and light leakage when the content of the carbon black is 0%.
Figure 7:
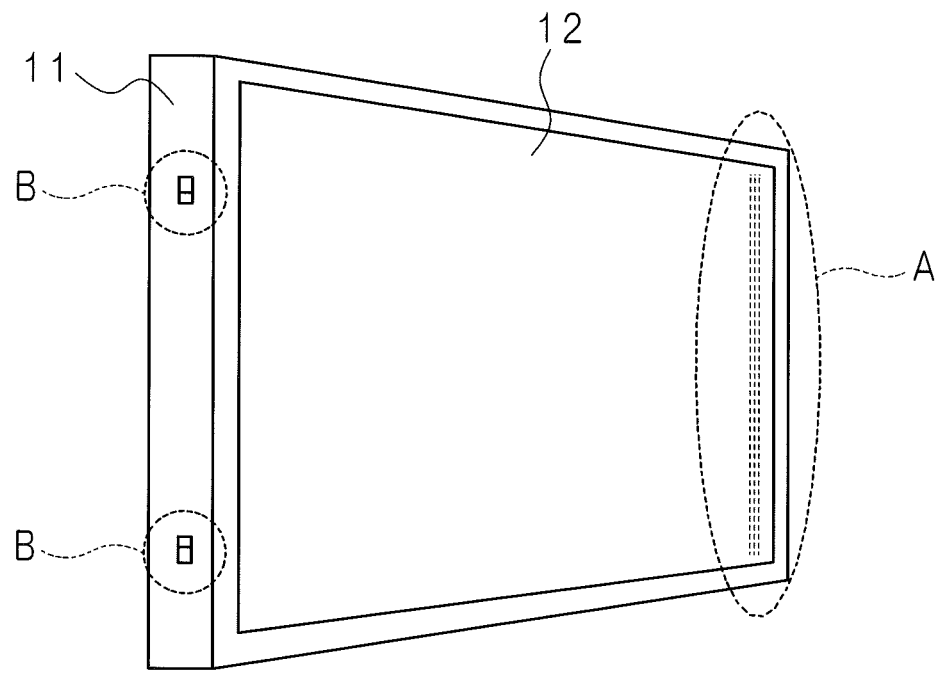
FIG. 7 is a schematic view illustrating an example of an appearance of an occurrence of the bright line and light leakage when the content of the carbon black is 0%.

FIG. 6 is a view describing an example of a mechanism for an occurrence of the bright line and light leakage when the content of the carbon black is 0%, and FIG. 7 is a schematic view illustrating an example of an appearance of an occurrence of the bright line and light leakage when the content of the carbon black is 0%. The components in FIG. 6 have the same configuration as those exemplified in FIG. 2, except that the content of the carbon black in the chassis 13 is 0%.

As illustrated in FIG. 6, most of the light emitted by the LED 15 is made incident on the end face 191 of the light guide plate 19 along the optical axis (in a direction perpendicular to the substrate 14 surface) of the LED 15. However, a part of the light emitted by the LED 15 is made incident toward the peripheral edge part of the display panel 12 (a portion of an edge of the display area), as illustrated by a symbol a in FIG. 6. If the content of the carbon black in the light guide plate holding part 134 and the sheet support part 135, etc. is 0%, the transmittance of light becomes 10%. Therefore, the light from the LED 15 is emitted from the peripheral edge part of the display panel 12 (the portion of the edge of the display area) to the outside. Thereby, band-shaped lines (bright lines) occur in the display area around a boundary between the display panel 12 and the bezel 11, as illustrated by a symbol A in FIG. 7.

In addition, if the content of the carbon black in the chassis 13 is 0%, the transmittance of light is 10%. Therefore, a part of the light emitted by the LED 15, as illustrated by a symbol b in FIG. 6, transmits through the chassis 13, is reflected by the inner surface of the bezel 11, and again transmits through the chassis 13. Then, the repeatedly reflected and transmitted light is emitted through the fitting hole 111 of the bezel 11 to the outside. Thereby, as illustrated by a symbol B in FIG. 7, light leaks from the fitting hole provided in the side part of the bezel 11. In particular, when seeing the screen of the television receiving apparatus 200 installed in a relatively dark room, since light leaks from the fitting hole of the bezel 11, it is not preferable in terms of the appearance of the display apparatus 100.

Further, in FIGS. 6 and 7, the leakage of light from the fitting hole 111 of the bezel 11 is exemplified, but a place of leaking the light is not limited to the example of FIGS. 6 and 7. For example, for the light leaked from between the chassis 13 and the side plate 161, or between the chassis 13 and the bezel 11 to the back surface, according to the present embodiment, since the chassis 13 does not allow light of the LED 15 to transmit therethrough, it is possible to reduce light leakage to the outside.

According to the present embodiment, since the chassis 13 is made of a white color system synthetic resin containing light shielding characteristics, light of the LED 15 is shielded by the chassis 13, and thereby it is possible to prevent the light from being leaked to the outside of the bezel 11.

More specifically, since the chassis 13 is made of a white color system synthetic resin containing light shielding characteristics, it is possible to prevent a situation that light of the LED 15 transmits through the chassis 13, and then leaks to the outside from the fitting hole 111. In addition, the fitting hole 111 and the protrusion part 131 are configured to be fitted to each other, thereby it is possible to prevent such a problem that screw fixing from the display panel 12 side to the back surface member side may not be performed due to a narrow width of the bezel 11 as an outer frame body, and achieve narrowing of the frame.

In addition, according to the present embodiment, the display apparatus includes the light guide plate 19 disposed between the display panel 12 and the backlight chassis 17 and heat dissipation plate 16, and the LED 15 disposed to face the end face 191 of the light guide plate 19, as well as the chassis 13 is provided so as to shield light emitted by the LED 15 from being made incident to the display panel 12. Thereby, even when seeing the display surface of the display panel 12 from the oblique direction toward the LED 15, since the chassis 13 having light shielding characteristics shields the light directly made incident to the display panel 12 from the LED 15, it is possible to prevent an occurrence of the bright line appearing when seeing the display surface from the oblique direction.

More specifically, the chassis 13 has the light guide plate holding part 134 and the sheet support part 135 disposed along the peripheral edge part of the display panel 12, between the display panel 12 and the light guide plate 19 as a light shielding part. Since the light guide plate holding part 134 and the sheet support part 135 shield the light directly made incident to the display panel 12 from the LED 15, it is possible to prevent an occurrence of the bright line appearing along the peripheral edge part of the display panel 12 when seeing the display surface from the oblique direction.

Further, in the present embodiment, the chassis 13 contains carbon black in a range from 0.003% to 0.02%. As illustrated in FIG. 5, if the content of the carbon black is less than 0-0.03%, the transmittance of light thereof becomes several %, for example, thereby it is not possible to prevent an occurrence of the light leakage or bright line. In addition, if the content of the carbon black exceeds 0.02%, the color of the chassis 13 becomes a relatively dark gray, thereby degrading the quality of the display apparatus. By making the content of the carbon black in a range of 0.003% to 0.02%, it is possible to prevent an occurrence of the light leakage or bright line, as well as maintain the quality of the display apparatus (overall judgment is excellent or good). In particular, by making the content of the carbon black to be 0.01% (overall judgment is excellent), even when the color tone of polycarbonate resin which is a material of the chassis 13 is slightly different due to the differences in material manufacturers, it is possible to absorb the differences in color tone, so that the content of the carbon black equivalently becomes within the range of 0.003% to 0.02%.

In addition, the transmittance of light of the chassis 13 is 0.1% or less. By making the transmittance of light thereof to be 0.1% or less, it is possible to prevent an occurrence of the light leakage or bright line, and maintain the quality of the display apparatus.

Further, the reflectance of the chassis 13 is 45% or more. If the reflectance becomes less than 45%, the color of the chassis 13 becomes a relatively dark gray, thereby degrading the quality of the display apparatus. By making the reflectance thereof to be 45% or more, it is possible to maintain the display quality in good condition.

In the above-described embodiment, the chassis 13 is configured to contain carbon black, but it is not limited thereto. For example, the chassis 13 made of a white color system polycarbonate resin may contain titanium oxide. The content of the titanium oxide is 30% or more. By containing the titanium oxide, it is possible to make the reflectance of the chassis 13 to be almost 100%, and make the transmittance of light to be 0.1% or less. Thereby, it is possible to prevent an occurrence of the light leakage or bright line, and maintain the quality of the display apparatus.

Embodiment 2

Figure 8:
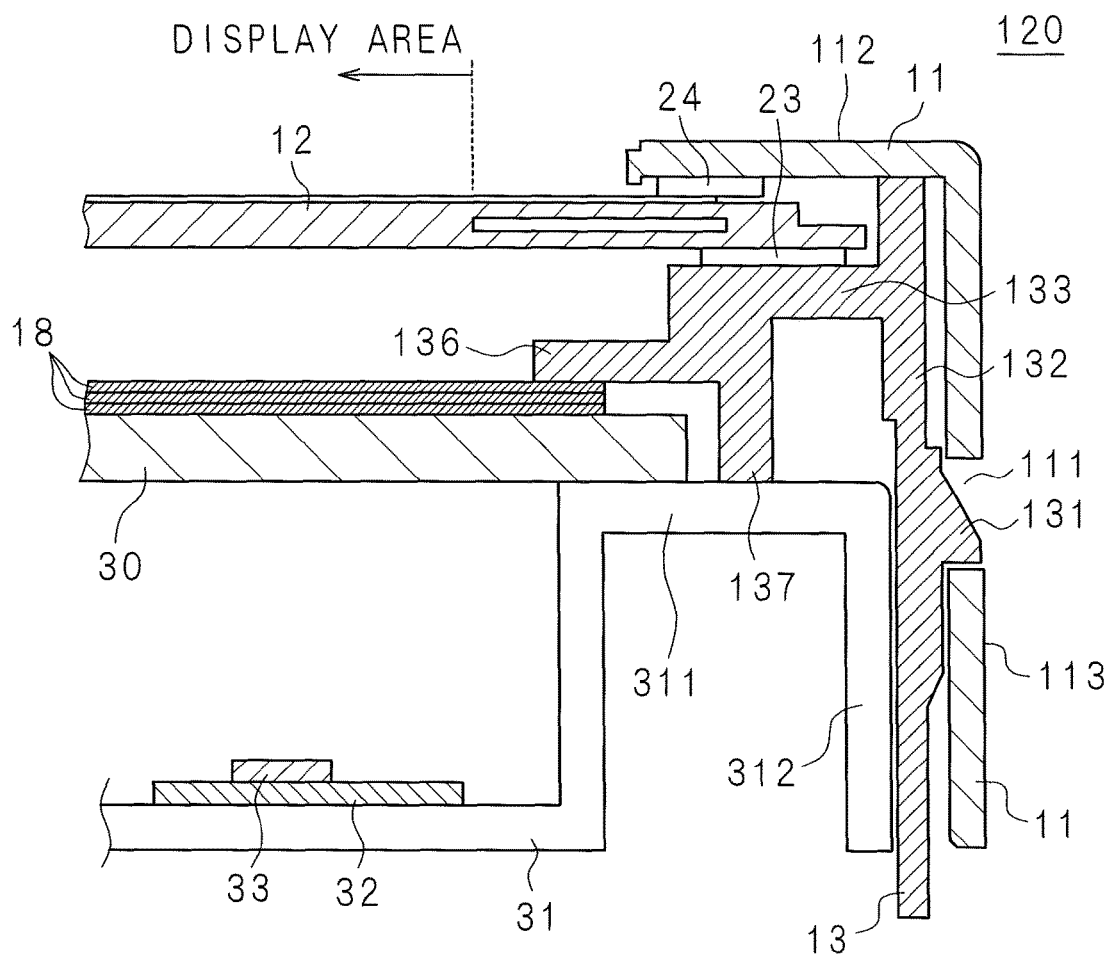
FIG. 8 is a cross-sectional view illustrating main components of a display apparatus of Embodiment 2.

FIG. 8 is a cross-sectional view illustrating main components of a display apparatus 120 of Embodiment 2. In Embodiment 1, the backlight employs a so-called edge light type, but it is not limited thereto. In Embodiment 2, a configuration using a so-called direct type system will be described. Embodiment 2 uses a diffusion plate 30, instead of the light guide plate 19.

The diffusion plate 30 is formed in a rectangular shape, and has vertical and horizontal dimensions substantially the same as those of the display panel 12. The diffusion plate 30 diffuses light from an LED 33 disposed on the back surface side thereof to irradiate the back surface side of the display panel 12 with uniform light. The material of the diffusion plate 30 may be a polystyrene resin, polycarbonate resin, or the like, but it is not limited thereto. The optical sheets 18 are disposed on one side of a display panel side (hereinafter also referred to as a front surface side) of the diffusion plate 30.

A backlight chassis 31 has vertical and horizontal dimensions substantially the same as those of the display panel 12, and a peripheral edge part thereof is bent in a substantially U shape. The backlight chassis has a holding part 311 which holds the peripheral edge part of the diffusion plate 30, and a facing part 312 which is bent in a substantially L shape from the holding part 311 and faces the side part 113 of the bezel 11. The backlight chassis 31 is disposed so as to cover the rear surface side of the diffusion plate 30, and fixes a substrate 32 on which the LED 33 is mounted.

The substrate 32 is formed in an elongated shape, and a plurality of LEDs 33 are arranged at a proper interval thereon. That is, the plurality of LEDs 33 are linearly disposed in a longitudinal direction of the substrate 32. The length of the substrate 32 is substantially equal to the vertical or horizontal dimension of the light guide plate 30, for example.

The chassis 13 is provided in the bezel 11. More specifically, the chassis 13 is disposed so as to surround the backlight chassis 31.

The side part chassis 132 is disposed between the facing part 312 of the backlight chassis 31 and the side part 113 of the bezel 11. The side part chassis 132 has a protrusion part 131 to be fitted to the fitting hole 111. By fitting the protrusion part 131 to the fitting hole 111, the bezel 11 and the chassis 13 are fixed to each other.

The chassis 13 has a panel support part 133 which extends from the side part chassis 132 toward the peripheral edge part of the display panel 12 to support the display panel 12, a pressing part 136 which extends from the panel support part 133 toward the diffusion plate 30 to support and press the diffusion plate 30 and the optical sheets 18, and an abutting part 137 which extends from the pressing part 136 to the backlight chassis 31 to abut the backlight chassis 31.

Further, the same parts as those in Embodiment 1 will be denoted by the same reference numerals, and will not be described. In addition, the examples illustrated in FIGS. 3, 4 and 5 are considered valid in Embodiment 2 except for the presence or absence of the bright line.

Figure 9:
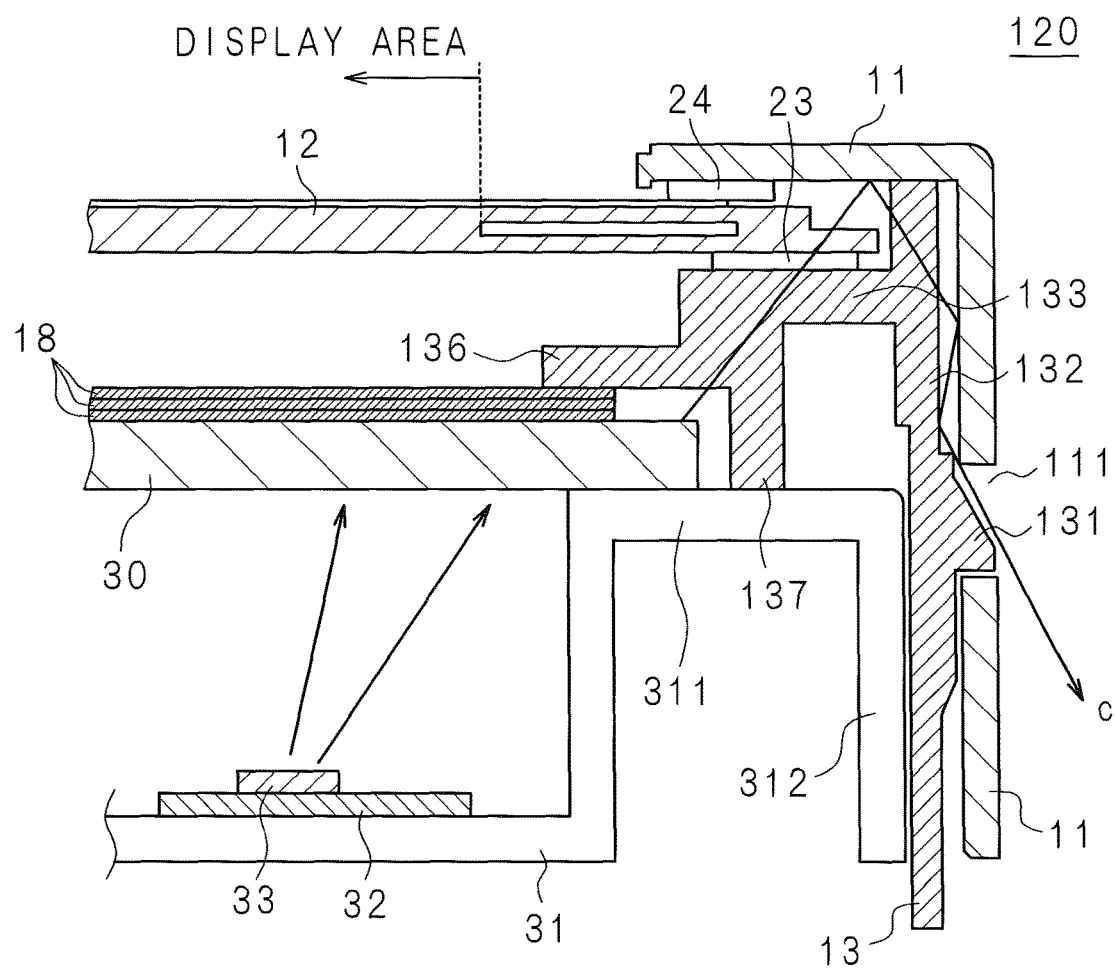
FIG. 9 is a view describing an example of a mechanism for an occurrence of the bright line and light leakage when the content of the carbon black is 0%.

FIG. 9 is a view describing an example of a mechanism for an occurrence of the bright line and light leakage when the content of the carbon black is 0%. If the content of the carbon black in the chassis 13 is 0%, the transmittance of light is 10%. Therefore, a part of the light emitted by the LED 33 transmits through the chassis 13, is reflected by the inner surface of the bezel 11, again transmits through the chassis 13, and then the repeatedly reflected and transmitted light is emitted through the fitting hole 111 of the bezel 11 to the outside, as illustrated by a symbol c in FIG. 9. Thereby, light leaks from the fitting hole provided in the side part of the bezel 11. In particular, when seeing the screen of the television receiving apparatus 200 installed in a relatively dark room, since light leaks from the fitting hole of the bezel 11, it is not preferable in terms of the appearance of the display apparatus 100.

According to Embodiment 2, since the chassis 13 is made of a white color system synthetic resin containing light shielding characteristics, light of the LED 33 is shielded by the chassis 13, and thereby it is possible to prevent the light from being leaked to the outside of the bezel 11.

More specifically, since the chassis 13 is made of a white color system synthetic resin containing light shielding characteristics, it is possible to prevent a situation that light of the LED 33 transmits through the chassis 13, and then leaks to the outside form the fitting hole 111. In addition, by employing the configuration in which the fitting hole 111 and the protrusion part 131 are fitted to each other, it is possible to prevent such a problem that screw fixing from the display panel 12 side to the back surface member side may not be performed due to a narrow width of the bezel 11, and achieve narrowing of the frame.

Further, in Embodiment 2, the chassis 13 contains carbon black within a range from 0.003% to 0.02%. As illustrated in FIG. 5, when the content of the carbon black is less than 0-0.03%, the transmittance of light thereof becomes several %, for example, thereby it is not possible to prevent an occurrence of the light leakage or bright line. In addition, when the content of the carbon black exceeds 0.02%, the color of the chassis 13 becomes a relatively dark gray, thereby degrading the quality of the display apparatus. By making the content of the carbon black in a range of 0.003% to 0.02%, it is possible to prevent an occurrence of the light leakage or bright line, as well as maintain the quality of the display apparatus (overall judgment is excellent or good). In particular, by making the content of the carbon black to be 0.01% (overall judgment is excellent), even when the color tone of polycarbonate resin which is a material of the chassis 13 is slightly different due to the differences in material manufacturers, it is possible to absorb the differences in color tone, so that the content of the carbon black equivalently becomes within the range of 0.003% to 0.02%.

In addition, the transmittance of light of the chassis 13 is 0.1% or less. By making the transmittance of light thereof to be 0.1% or less, it is possible to prevent an occurrence of the light leakage or bright line, and maintain the quality of the display apparatus.

Further, the reflectance of the chassis 13 is 45% or more. If the reflectance becomes less than 45%, the color of the chassis 13 becomes a relatively dark gray, thereby degrading the quality of the display apparatus. By making the reflectance thereof to be 45% or more, it is possible to maintain the display quality in good condition. Technical features described in the above embodiments of the present invention can form a new technical solution in combination with each other.

As this description may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus which includes a display panel having a display surface on one surface thereof, a back surface member disposed on the other surface side of the display panel, a light source disposed between the display panel and the back surface member, an outer frame body which covers a peripheral edge part of the display panel and surrounds the back surface member, and an inner frame body which holds the display panel and is provided in the outer frame body, the display apparatus further comprising:
a substrate with the light source disposed thereon; and
a heat dissipation plate with the substrate fixed,
wherein the inner frame body is made of a white color system synthetic resin containing light shielding characteristics, and
the outer frame body comprises:
a front face part covering the peripheral edge part of the display surface of the display panel, and
a side part which is bent from the front face part in a substantially L shape,
wherein the side part has a fitting hole, and
the inner frame body has a protrusion part to be fitted to the fitting hole, and the inner frame body is disposed between the heat dissipation plate and the side part.

2. The display apparatus according to claim 1, comprising:
a light guide plate disposed between the display panel and the back surface member, wherein
the light source is disposed to face an end face of the light guide plate, and
the inner frame body is provided so as to shield light emitted by the light source from being made incident to the display panel.

3. The display apparatus according to claim 2, wherein the inner frame body has a light shielding part disposed along the peripheral edge part of the display panel, between the display panel and the light guide plate.

4. The display apparatus according to claim 1, wherein the inner frame body contains titanium oxide.

5. The display apparatus according to claim 1, wherein the inner frame body has a reflectance of 45% or more.

6. A display apparatus which includes a display panel having a display surface on one surface thereof, a back surface member disposed on the other surface side of the display panel, a light source disposed between the display panel and the back surface member, an outer frame body which covers a peripheral edge part of the display panel and surrounds the back surface member, and an inner frame body which holds the display panel and is provided in the outer frame body,
wherein the inner frame body is made of a white color system synthetic resin containing light shielding characteristics, and
the inner frame body contains carbon black in a range of 0.003% to 0.02%.

7. A display apparatus which includes a display panel having a display surface on one surface thereof, a back surface member disposed on the other surface side of the display panel, a light source disposed between the display panel and the back surface member, an outer frame body which covers a peripheral edge part of the display panel and surrounds the back surface member, and an inner frame body which holds the display panel and is provided in the outer frame body,
wherein the inner frame body is made of a white color system synthetic resin containing light shielding characteristics, and
the inner frame body has a transmittance of light of 0.1% or less.

8. The display apparatus according to claim 2, wherein the inner frame body comprises a side part chassis and a panel support part extending from the side part chassis toward the peripheral edge part of the display panel to support the display panel.

9. The display apparatus according to claim 8, wherein the inner frame body comprises a light guide plate holding part extending from the panel support part toward the light guide plate to hold the light guide plate.

10. A display apparatus which includes a display panel having a display surface on one surface thereof, a back surface member disposed on the other surface side of the display panel, a light source disposed between the display panel and the back surface member, an outer frame body which covers a peripheral edge part of the display panel and surrounds the back surface member, and an inner frame body which holds the display panel and is provided in the outer frame body, wherein the inner frame body is made of a white color system synthetic resin containing light shielding characteristics, and the outer frame body comprises:
    a front face part covering the peripheral edge part of the display surface of the display panel; and
    a side part which is bent from the front face part in a substantially L shape, wherein the side part has a fitting hole, and the inner frame body has a protrusion part to be fitted to the fitting hole, the display apparatus further comprising:

a light guide plate disposed between the display panel and the back surface member; and optical sheets disposed between the display panel and the light guide plate, wherein the light source is disposed to face an end face of the light guide plate, and the inner frame body is provided so as to shield light emitted by the light source from being made incident to the display panel, and the inner frame body further comprises:
    a side part chassis;
    a panel support part extending from the side part chassis toward the peripheral edge part of the display panel to support the display panel;
    a light guide plate holding part extending from the panel support part toward the light guide plate to hold the light guide plate; and
    a sheet support part bent from the light guide plate holding part n a substantially L shape to support the optical sheets.

* * * * *